(12) United States Patent
Narcross (10) Patent No.: US 10,990,880 B2
(45) Date of Patent: Apr. 27, 2021

(54) BRAIN EMULATOR SUPPORT SYSTEM

(71) Applicant: Fred Narcross, Chengdu (CN)

(72) Inventor: Fred Narcross, Chengdu (CN)

(*) Notice: Subject to any disclaimer, the term of this patent is extended or adjusted under 35 U.S.C. 154(b) by 414 days.

(21) Appl. No.: 16/161,465

(22) Filed: Oct. 16, 2018

(65) Prior Publication Data

US 2019/0050737 A1 Feb. 14, 2019

Related U.S. Application Data (62) Division of application No. 14/821,738, filed on Aug. 8, 2015, now Pat. No. 10,817,785.

(60) Provisional application No. 62/035,390, filed on Aug. 9, 2014.

(51) Int. Cl.
*G06N 3/10* (2006.01)
*G06N 3/04* (2006.01)

(52) U.S. Cl.
CPC .............. *G06N 3/10* (2013.01); *G06N 3/04* (2013.01)

(58) Field of Classification Search
CPC .................................. G06N 3/10; G06N 3/04
See application file for complete search history.

(56) References Cited

U.S. PATENT DOCUMENTS

| | | | | | |
|---|---|---|---|---|---|
| 5,410,716 | A * | 4/1995 | Mitterauer | ............... | G06N 3/04 700/246 |
| 5,781,702 | A * | 7/1998 | Alhalabi | ................... | G06N 3/02 706/27 |
| 6,882,992 | B1 * | 4/2005 | Werbos | ................ | G05B 13/027 706/48 |
| 7,627,540 | B2 * | 12/2009 | Snook | ................. | G06F 15/7867 706/15 |
| 8,126,828 | B2 * | 2/2012 | Snook | ...................... | G06N 3/10 706/27 |
| 9,208,430 | B2 * | 12/2015 | Solari | .................... | G06N 3/008 |
| 9,530,091 | B2 * | 12/2016 | Hawkins | ............... | G06N 7/005 |
| 2007/0106479 | A1 * | 5/2007 | Geerts | .................... | G16H 50/50 702/19 |
| 2008/0201284 | A1 * | 8/2008 | Massaquoi | ............. | G06N 3/105 706/30 |
| 2009/0106007 | A1 * | 4/2009 | Massaquoi | ............... | G06N 3/04 703/11 |
| 2009/0182697 | A1 * | 7/2009 | Massaquoi | ............... | G06N 3/04 706/44 |
| 2014/0067740 | A1 * | 3/2014 | Solari | .................... | G06N 3/008 706/27 |

(Continued)

FOREIGN PATENT DOCUMENTS

WO WO-2013090451 A1 * 6/2013 ............. G06N 3/008

OTHER PUBLICATIONS

Shanahan, Murray; A cognitive architecture that combines internal simulation with a global workspace; ELSEVIER; Consciousness and Cognition 15 (2006) 433-449. (Year: 2006).*

(Continued)

*Primary Examiner* — Stanley K. Hill
(74) *Attorney, Agent, or Firm* — Steven A. Hill (57) ABSTRACT

A technology to build emulated nervous systems is presented here, as well as the interface method for operating the emulated nervous system. The technology provides for inclusion of neuroanatomically accurate definitions organized hierarchically. This permits a highly realistic nervous system to be created and interact with its surrounding environment.

4 Claims, 8 Drawing Sheets

(56) References Cited

U.S. PATENT DOCUMENTS

2016/0042270 A1* 2/2016 Narcross ................. G06N 3/04
  706/31

OTHER PUBLICATIONS

Cattell, Rick et al.; Challenges for Brain Emulation: Why is Building a Brain so Difficult?; 2012; ResearchGate; pp. 1-28. (Year: 2012).*

Sandberg, Anders; Feasibility of Whole Brain Emulation; 2013; Springer-Verlag Berlin Heidelberg; Philosophy and Theory of Artificial Intelligence, SAPERE 5, pp. 251-264. (Year: 2013).*

Dai, Kael et al.; Brain Modeling ToolKit: An open source software suite for multiscale modeling of brain circuits; PLOS Computational Biology; 2020; pp. 1-23. (Year: 2020).*

* cited by examiner

BRAIN EMULATOR SUPPORT SYSTEM

CROSS-REFERENCE TO RELATED APPLICATIONS

This application is a divisional of U.S. application Ser. No. 14/821,738, entitled "BRAIN EMULATOR SUPPORT SYSTEM," and filed on Aug. 8, 2015, which claims priority benefit of Provisional Application Ser. No. 62/035,390, "BRAIN EMULATOR SYSTEM," filed Aug. 9, 2014, the entire contents of which are incorporated herein in its entirety as if set forth in full.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

REFERENCES

Malcom Carpenter, Human Neuroanatomy, January 1996|ISBN-10: 0683067524|ISBN-13: 978-0683067521

K. Brodmann, Localisation in the Cerebral Cortex, December 2005 ISBN: 978-0-387-26917-7

Lodish H, Berk A, Zipursky S L, et al., Overview of Neuronal Outgrowth, Molecular Cell Biology, W. H. Freeman and Company Chai MuhChyi, Berry Juliandi, Taito Matsuda, Kinichi Nakashima, "Epigenetic regulation of neural stem cell fate during corticogenesis," International Journal of Developmental Neuroscience, Volume 31, Issue 6, October 2013, Pages 424-433, ISSN 0736-5748

Hakan Kucukdereli, Nicola J. Allen, Anthony T. Lee, Ava Feng, M. Ilcim Ozlu, Laura M. Conatser, Chandrani Chakraborty, Gail Workman, Matthew Weaver, E. Helene Sage, Ben A. Barres, and Cagla Eroglu, "Control of excitatory CNS synaptogenesis by astrocyte-secreted proteins Hevin and SPARC," *PNAS* 2011 108 (32) 12983-12984

Steinmetz C C, Buard I, Claudepierre T, Nagler K, Pfrieger F W, "Regional variations in the glial influence on synapse development in the mouse CNS," *J Physiol* 577: 249-261 2006

Louis Hugues Nicolas Bredech, *Simbad,* 2004, simbad.sourceforge.net/

Patsy S Dickinson, "Neuromodulation of central pattern generators in invertebrates and vertebrates," *Current Opinion in Neurobiology* Volume 16, Issue 6, December 2006, Pages 604-614

Ann E. Kelley, Brian A. Baldo, Wayne E. Pratt, Matthew J. Will, "Corticostriatal-hypothalamic circuitry and food motivation: Integration of energy, action and reward," *Physiol Behav.* 2005 Dec. 15; 86(5):773-95. Epub 2005 Nov. 14

Tommaso Felin, "Communication between neurons and astrocytes: relevance to the modulation of synaptic and network activity," *Journal of Neurochemistry* Volume 108, Issue 3, pages 533-544, February 2009

TECHNICAL FIELD

The subject technology is in the technical field of nervous system emulation and simulation, as well as systems and methods for building the emulation, and apparatus for making use thereof.

BACKGROUND

The technology's background stems from earlier work in the field of biological neural networks. This field differentiates itself from both Neural Networks (NN) and Artificial Neural Networks (ANN). The latter two fields are biologically inspired stochastic and probabilistic processes for categorizing, analyzing and recognizing narrow categories of data. Their most recent successes in the fields of Big Data analysis, handwriting and vision have made them quite popular. Yet, they remain narrow in their focus, difficult to integrate together, e.g. vision and audition, and require hundreds to thousands of training trials before their recognition accuracy is sufficient for commercial application. In contrast, biological neural networks have proved useful for modeling neural tissue but do to organizational complexity the models are typically limited to hundreds to thousands of neurons. The technology presented here overcomes both the issues of organizational complexity of biological neural networks as well as the integration issues of NNs and ANNs.

ADVANTAGES

Neurological illnesses, such as Alzheimer's and Epilepsy, affect more than 50 million Americans annually at a cost of more than $500 billion. A tool which can model cerebral cortex and cerebral nuclei could be vital in the research to reduce these costs.

The technology presented here poses a complete management solution to address the problem of integrating sensors, actuators and subsystems control for robots. Like humanoid robots the technology uses biology as its model to address these problems.

The technology could replicate the emotional cortical structures of humans and be applied to the challenge of accurately monitoring and predicting human emotions. The practical application of an emotional monitor spans the fields of entertainment, personal assistants and security.

Because the technology builds nervous system simulations and because nervous systems are capable of intelligence there is the potential to provide significant innovation in the field of creating artificially intelligent systems. Such learning systems have wide application in visual systems and inspection, language and translation, large data analysis, and intelligent embedded systems in electronic products as diverse as telephones, toys, televisions, computers and "companions" for disabled or elderly. It would also provide an intelligent base for monitoring and control of devices integrated by the Internet of Things (IoT) in homes and the workplace.

SUMMARY

The subject technology organizes hierarchically organized, neuroanatomic definitions to create nervous system (NS) simulations. Though there are good tools available to simulate biologically accurate individual neurons and small collections of quasi-neurons for special purpose algorithms (neural networks) there are no off-the-shelf tools for massively simulating or emulating entire biological NSs. However, with the subject technology any NS that can be sufficiently defined can be built and simulated. The more accurate and complete the definitions the more closely the resulting NS will replicate a biological system. As such, the subject technology is unique and would support many important functions.

DETAILED DESCRIPTION OF THE DRAWINGS

Figure 1:
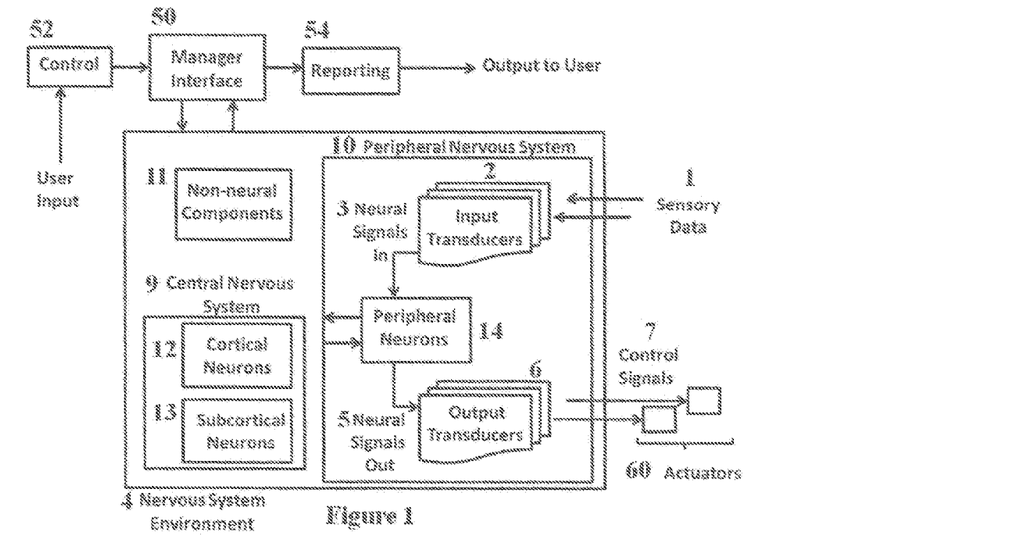
FIG. 1 illustrates a topological and functional overview of the various components of a completed Nervous System Environment in use.

FIG. 1 illustrates Nervous System Environment 4 interacting with an external environment consisting of Sensor Data 1 that serves as input as well as consisting of Actuators 60 which serve as output devices. Data 1 could be any analog or digital signal; commonly consisting of visual or auditory data but also including IoT devices like thermal, or robotic devices for pressure or for stepper motor rotation. Likewise, Actuators 60 could include any kind of electronic or electro-mechanical device, commonly a sound producing vocal generator but also including IoT actuators like sound or lighting control or for robotic devices like arms, legs, and hands. Sensor Data 1 is passed to Peripheral Nervous System 10 where it is converted into a Neural Signal 3 by user supplied Input Transducers 2 and buffered for use by Peripheral Neurons 14. Neurons 14 use the buffered input to activate their axons directly. Those axon signals are then processed by the Central Nervous System 9. The Central Nervous System 9 also sends its own axon signals to Neurons 14 which activates Neuron 14's dendrites from which Neural Signals 5 are extracted and buffered for conversion by Output Transducers 6. Resulting transduced signals become the Control Signals 7 fed to electro or electro-mechanical Actuators 60 that form part of an environment which is external to Environment 4. In addition to Central Nervous System 9 and Peripheral Nervous System 10 the Nervous System Environment 4 may include Non-Neural Components 11, which are detailed further in FIG. 2, FIG. 3 and FIG. 4. Non-Neural Components 11 are optional and can be thought of as interior aspects of the human body like blood or hormones. An additional part of the environment external to Environment 4 consists of the user's ability to monitor and control Environment 4. This occurs through a direct Manager Interface 50 which takes data from Control 52, prepared form data from the User, for starting and stopping Environment 4. As well, Manager Interface 50 can extract Environment 4's data, format it and report it through a Reporting 54 component to the User.

Figure 2:
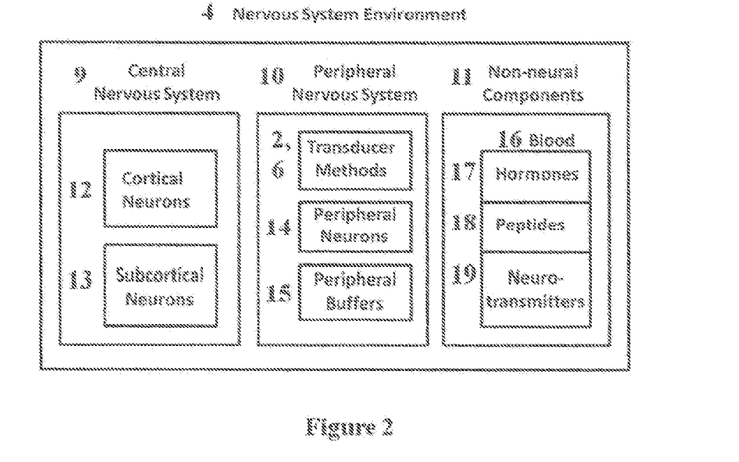
FIG. 2 illustrates structure of a Nervous System Environment.

FIG. 2 illustrates a structural view of the isolated Nervous System Environment 4 and consists of three main components: Central Nervous System 9, Peripheral Nervous System 10 and Non-Neural Components 11. Central Nervous System 9 models the brain and spinal cord and Peripheral Nervous System 10 models spinal and cranial nerves. Central Nervous System 9 consists of Cortical Neurons 12 and Subcortical Neurons 13. Neurons 12 model the cerebral hemispheres and Neurons 13 model brain stem structures and the cerebellum. Peripheral Nervous System 10 consists of Transducer Methods 2 and 6, written in a computer language like Java, for transducing data into and out of Environment 4 respectively. Additionally, Peripheral Nervous System 10 contains Peripheral Buffers 15 for the temporary storage of data passing through 2 and 6. Peripheral Buffers 15 either take data from or pass data to the Peripheral Neurons 14. Also illustrated in FIG. 2 are optional Non-Neural components 11. A typical example of Non-Neural components 11 would be a Blood Component 16. That component can then serve as a carrier of any desirable substance. In FIG. 2, the substances shown are Hormones 17, Peptides 18 and Neurotransmitters 19. It is noteworthy that the optional components could also be entire organs or organ systems, for example the digestive tract.

Figure 3:
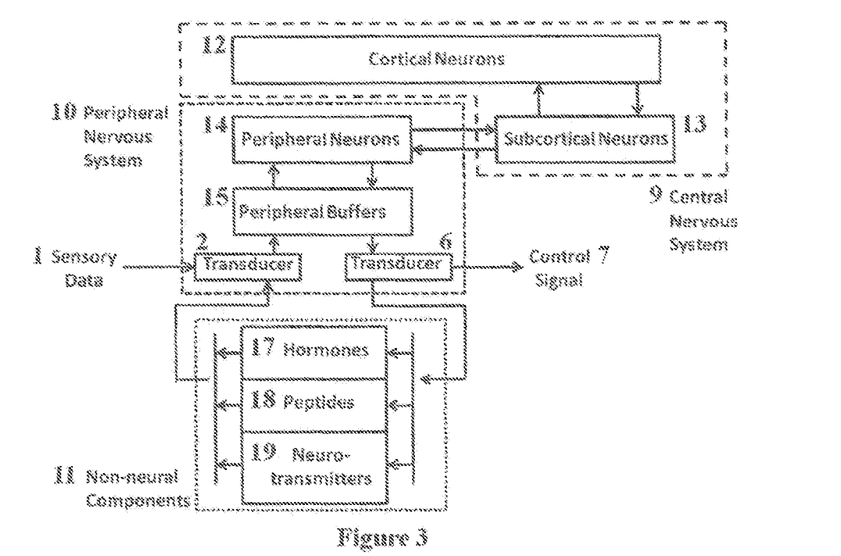
FIG. 3 illustrates functional relationships between the components of the Nervous System Environment.

FIG. 3 illustrates in further detail the functional relationships of the components of Nervous System Environment 4. As depicted, Sensory Data 1 is transduced at Transducer 2 and buffered at Peripheral Buffers 15. The buffered data activates Neurons 14 and results may pass to Subcortical Neurons 13. Neurons 13 may in turn, pass data to Cortical Neurons 12. Neurons 12 process the information at which point there may be a turnaround through the aforementioned structures: Neurons 12 passing data to Neurons 13, which pass data to Neurons 14 and in turn to Buffers 15. The outbound signals can then be transduced at Transducer Method 6 and pass externally as Control Signals 7. Optionally, and as illustrated here with Blood Components 17, 18 and 19, they can also cause a signal to be generated and processed as the aforementioned Data 1. It is also noteworthy that depending on the Neurons 13 and their function there may be no Neural Signal passed to Neurons 12. That is, the extent of the subcortical processing could remain within Neurons 13 as in the case shown in FIG. 4.

Figure 4:
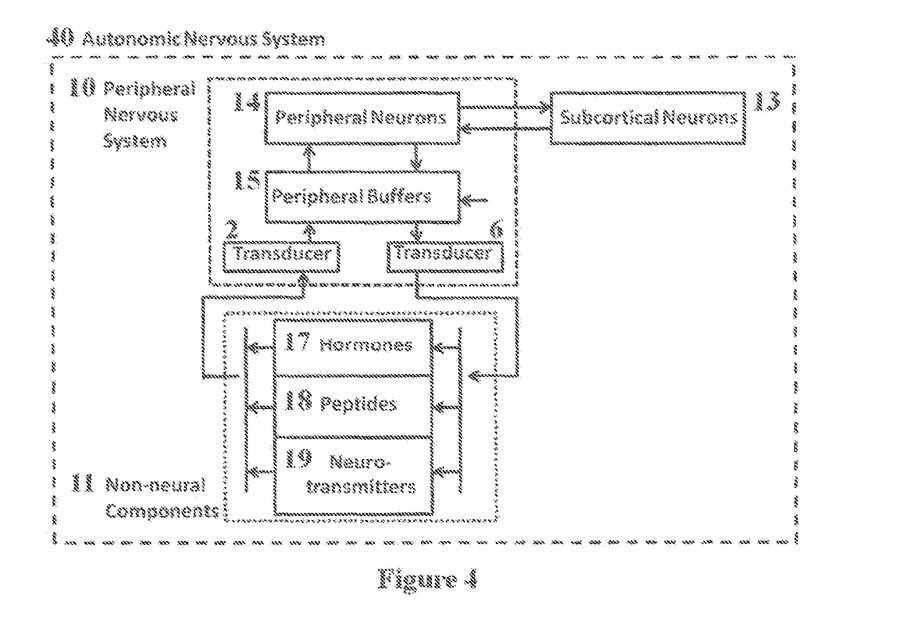
FIG. 4 illustrates modeling an Autonomic Nervous System.

FIG. 4 illustrates modeling an Autonomic Nervous System 40 with the technology. This is an optional step. In this figure Autonomic Nervous System 40 is divided into three primary components: Peripheral Nervous System 10, Subcortical Neurons 13 and Non-Neural Components 11; collectively forming a closed system which regulates primarily visceral functions to maintain homeostasis. This balancing is maintained below the level of Neurons 12 activity, which correspondingly are not shown.

Figure 5:
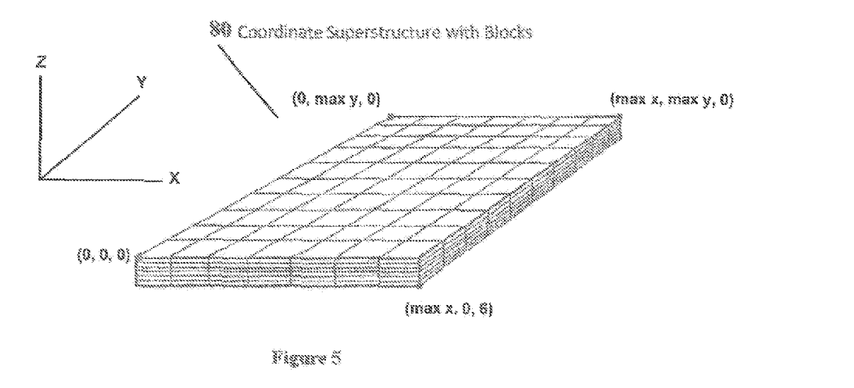
FIG. 5 illustrates coordinate topology in the form of a Coordinate Superstructure with Blocks.

FIG. 5 illustrates the beginning of how the technology organizes the hierarchical neuroanatomic definitions. When the definitions are completed a series of processes builds the definitions into Environment 4 ready for simulation. In this illustration a 3-dimensional coordinate system is constructed along x, y and z axes. The coordinate system is divided into blocks which lend themselves to defining distinct areas as in FIG. 6. This highest level organization within Coordinate Superstructure with Blocks 80 follows Brodmann's chart designations of distinct cytoarchitectural areas. For Neurons 12 there are typically six layers along the z-axis per block, whereas for Neurons 13 there are typically three layers. Superstructure 80 is flat, which simplifies the topology without loss of function. The maximum x, y coordinates are computed from an algorithm which first looks at the number of blocks to be allocated as defined by the user in Cortical Distribution Table 1. Table 1 shows three parameters, which are duplicated per area the user defines. The total number of these definitions in Table 1 are the number of blocks to be allocated. Then the maximum number of neuron allocations per layer per block are searched for using Table 1 and Cortical Layers Table 2. The square root of the maximum number is rounded up to an integer value and establishes the length and width of a block with enough additional space so that neurons do not have to be allocated on top of each other. The length and width of the maximum block size serves as the base of coordinates needed for all blocks in the Superstructure 80. The maximum coordinates are then the number of blocks times the individual blocks' length and widths respectively.

TABLE 1

Cortical Distribution Table

| | Parameter | Description |
|---|---|---|
| 201 | Cortical Area Number | Brodmann's chart number of distinct cortical area |
| 202 | Subcortical Area Number | Number to demarcate distinct subcortical area |
| 203 | Block Number | Block's number in the coordinate superstructure The above pairings of 201 and 203, or 202 and 203, are created for every block in the superstructure. |

TABLE 2

Cortical Layers Table

| | Parameter | Description |
|---|---|---|
| 201 | Cortical Area Number | Brodmann's chart number of distinct cortical area |
| 202 | Subcortical Area Number | Number to demarcate distinct subcortical area |
| 211 | Layer Number | Layer number for 201 or 202 |
| 212 | Neuron Type | Neuron type inhabiting 211 |
| 213 | Repetitions | Number of duplications of 212 in fins layer 211 |
| 214 | Preferences | Connection preferences for this 212 Other neuron type 212 Exclusive or not . . . |

TABLE 2-continued

Cortical Layers Table

| | Parameter | Description |
|---|---|---|
| 215 | Default Preference | Controls the default of nearest neighbor or random connection for this neuron: 0—nearest, 1—random The above definitions are created for every unique Area Number 201 and 202 in Table 1 |

Figure 6:
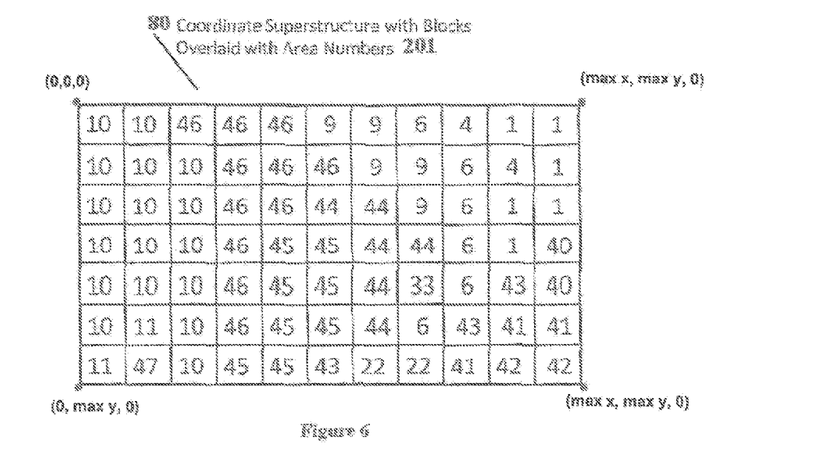
FIG. 6 illustrates Coordinate Superstructure with Blocks overlaid with Brodmann area numbers for each block.

FIG. 6 illustrates an overhead view of part of the Superstructure 80 overlaid with area numbers 201. When the user chooses numbers to represent cortical areas, as illustrated, those numbers could come from a Brodmann's area chart (51 distinct areas) or from any organizational chart that distinguishes cytoarchitectural areas, e.g. Vogts ('19) parcellation (200 distinct areas). The user is also free to create any designation that is meaningful. The area numbers can also represent subcortical structures 202. The block-natured superstructure permits repetition of cortical area definitions without requiring the user to redefine each block's internal organization. The same area type can cover large or small volumes (many blocks or a single block) as best suits the users' needs and requirements.

Figure 7:
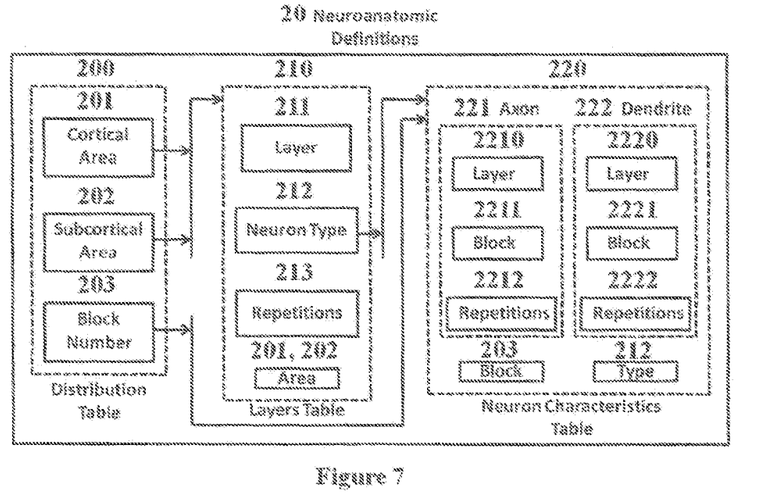
FIG. 7 illustrates hierarchical, user supplied neuroanatomic definitions used to build a NS.

FIG. 7 illustrates completed hierarchy of Neuroanatomic Definitions 20 in the form of three sets of table definitions with interrelated parameters: Distribution Table 200, Layers Table 210 and Neuron Characteristics Table 220. When a neuroanatomist distinguishes an area as being cytoarchitecturally distinct, they base this highest level designation on the number of layers of the area and the neuron types and abundance of these types within each layer. That approach is replicated by the technology in Tables 200, 210 and 220 within FIG. 7. The user first of all establishes high level area designations 201 and 202 of distinct areas within Table 200 for each Block Number 203 of the entire Superstructure 80. Each area then has its layers defined within Table 210, which identifies per Layer 211, the Neuron Types 212 and the abundance of those neurons, Repetitions 213. Then, the specific characteristics of the Types 212 are elaborated within Neuron Characteristics Table 220. Note that Neuron Characteristics Table 220 requires an Area 201 or Area 202 parameter to specify a Layer 211 as well as a Block 203 parameter. This supports the ability to specify that an axon can travel outside of its own Block 203 to terminate in another 203 within the Superstructure 80. This supports a brain's long-range communications mimicking fasciculi as well as short-range inter-area communications. Table 220 also contains detail about Type 212's Axons 221 and Dendrites 222. Axon 221 parameter consists of its termination designation as specified by Layer 2210 and Block 2211 and the number of axon branches as specified by its Repetition 2212 parameter. Dendrite 222 parameter consists of its origination as specified by Layer 2220 and Block 2221. These origination parameters support the concept of localized dendrite compartments at layers different from that of the neuron's soma. As well, the designations support a dendrite crossing block boundaries for inter-region communication. Accordingly this permits modeling the reality that Areas 201 and 202 are not isolated islands of consistency but blend into other Areas 201 and 202 respectively.

TABLE 3

Neuron Characteristics Table

| | Parameter | Description |
|---|---|---|
| 203 | Block Number | Block number from Distribution Table |
| 212 | Neuron Type | Neuron type from Layers Table |
| 221 | Axon | Axon for 212 |
| | Axon Layer | Termination layer for 221 |
| | Axon Block | Termination block for 221 |
| | Axon Repetitions | Number of duplications for 221 |
| 222 | Dendrite | Dendrite for 212 |
| | Dendrite Layer | Origination layer for 222 |
| | Dendrite Block | Origination block for 222 |
| | Dendrite Repetitions | Number of duplications for 222 |
| | | The above definitions are created for every block in the superstructure. |

TABLE 4

Variable Control Table

| | Parameter | Description |
|---|---|---|
| 270 | MGB Buffer Size | Size of Medial Geniculate Body buffer |
| 271 | LGB Buffer Size | Size of Lateral Geniculate Body buffer |
| 272 | VPL Buffer Size | Size of Ventral Posterolateral buffer |
| 273 | Blood Buffer Size | Size of Blood Components buffer |
| 276 | Proximal Distance | Maximum distance considered for connections |
| 279 | Default Connection | Controls the default of nearest neighbor or random connection for all neurons: 0—nearest, 1—random |
| 280 | Spike Percentage | Percentage of active dendrites required to form spike |
| 281 | Run Type | Execution parameter:<br>1 = external simulator<br>2 = internal simulator<br>3 = external hardware |
| 290 | Build Type | Build parameter:<br>1 = create new neuron tile<br>2 = use existing neuron tile<br>3 = use and update existing neuron file |
| 291 | Input File Name | Name of neuron records input file |
| 291 | Output File Name | Name of neuron records output file |

Figure 8:
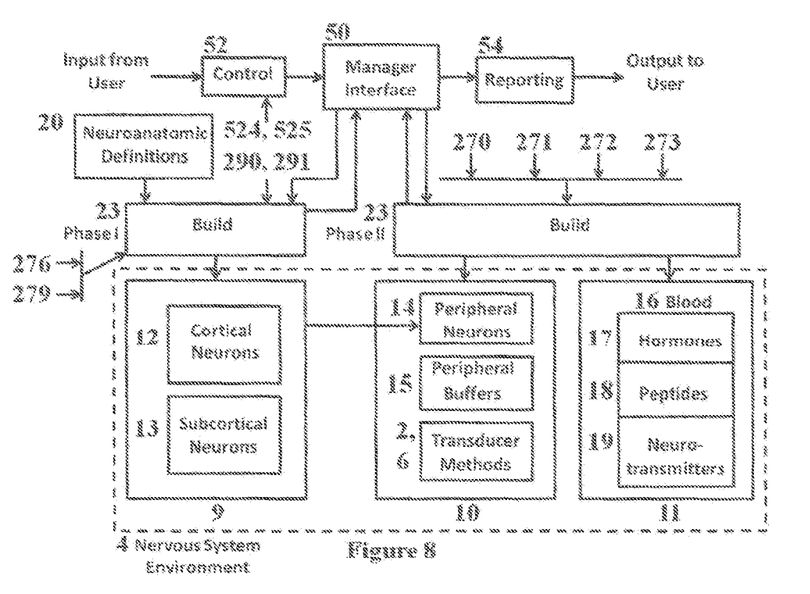
FIG. 8 illustrates Build Phase I and Build Phase II processes which construct the Nervous System Environment.

FIG. 8 illustrates an overview of Build 23 processes, which take the Neuroanatomic Definitions 20 and parameters from Variable Control Table 4 and create Nervous System Environment 4 consisting of Central Nervous System 9, Peripheral Nervous System 10 as well as Non-Neuronal Components 11. As directed by user input, Control 52 reads parameters 524 and 525 from Control Table 7 to determine whether or not Build 23 processes should be followed immediately by a simulation run or not. Control 52 directs Manager Interface 50 to initiate Build 23 Phase I. Build 23 Phase I reads parameters 290 and 291 from Variable Control Table 4 to establish what kind of Neuron File should be created as a result of Build 23. Neuron File detail is provided in FIG. 9 and FIG. 10 and consists of neurons 12 and Neurons 13.

TABLE 7

Control Table

| | Parameter | Description |
|---|---|---|
| 521 | Start Simulation | Start the simulation run using neuron file 291 |
| 522 | Pause Simulation | Pause the simulation |
| 523 | Stop Simulation | Stop the simulation |
| 524 | Start Build | Start the Build process 23 Phase I and Phase II |
| 525 | Start Build and Run | Start the Build process 23 and begin simulation 521 |

Neurons 13 created by Build 23 Phase I also organize Peripheral Neurons 14 created during Build 23 Phase II in that Neurons 13 are organized into distinct Subcortical Area 202 whereas Neurons 14, which are part of Peripheral Nervous System 10, become part of the input/output to those 202 areas. Build 23 Phase II is automatically initiated by Manager Interface 50 upon the successful completion of Build 23 Phase I. Build 23 Phase II reads parameters 270, 271, 272 and 273 from Variable Control Table 4 in order to establish sizes for Peripheral Buffers 15 in Peripheral Nervous System 10. Peripheral Buffers 15 are created as a result of 23 Phase II instantiating the classes to which the buffers belong. In one embodiment, Java classes for thalamic nuclei Medial Geniculate Body (MGB)—sound, Lateral Geniculate Body (LGB)—vision, Ventral Posterolateral (VPL)—touch and pain, and Blood are provided with the technology but require user customization to Methods 2 and 6 to precisely fit the user's requirements. Blood 16 component for the hunger related hormone, ghrelin, is also provided with the technology in Hormones 17. Other components for Peptides 18 or Neurotransmitters 19 would need to be provided by the user but would be modeled similarly to 17. Manager Interface 50 monitors both 23 Phase I and II and passes the resulting data through Reporting 54 module for report formatting as Output to User.

Figure 9:
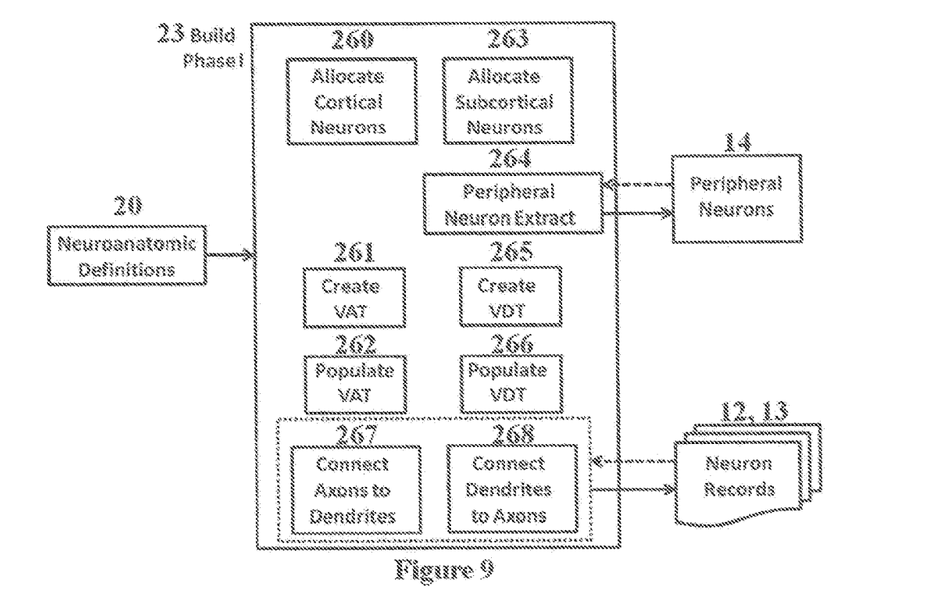
FIG. 9 illustrates Build Phase I processes in further detail.
Figure 10:
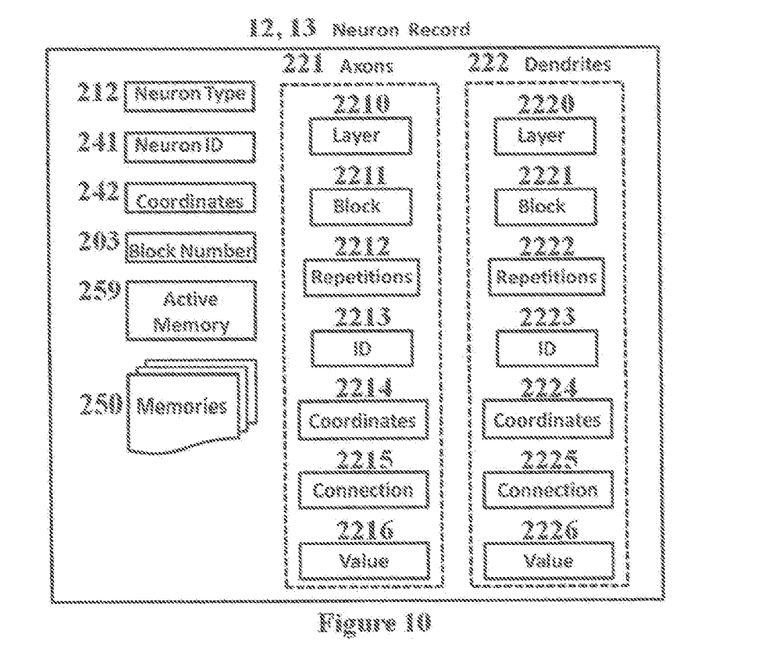
FIG. 10 illustrates Neuron Record detail that results from the Build Phase I process.

FIG. 9 illustrates further detail of Build 23 Phase I processes. Allocate Cortical Neurons 260 reads Definitions 20 in a top-down manner as illustrated in FIG. 7. In other words, from Cortical Area 201 to Layer 211 then for each Type 212 within 211 a Neuron Record 12 is allocated of requested Type 212 and the allocation is repeated according to Repetitions 213. When Record 12 is allocated Axons 221 and Dendrites 222 are also allocated according to Repetitions 2212 and 2222 accordingly. The result is Neuron Record 12 as illustrated in FIG. 10. Next, Create VAT 261 process is called to create a coordinate skeleton for the entirety of Axons 221 each of which has Coordinates 2214. Coordinates 2214 are then populated to the VAT by Populate VAT 262. Next, Allocate Subcortical Neurons 263 is invoked to create Neuron 13 records. To accomplish this, Allocate 263 uses the Definitions 20 by reading all of the Area 202 definitions and for each one, looks at each Layer 211 parameter and for each one looks at the Neuron Type 212 and Repetitions 213 and allocates the corresponding number of Neuron 13 records as illustrated in FIG. 10. Next, Peripheral Neuron Extract 264 process is called, which goes through the list of Neuron 13 records looking for those which require Peripheral Neuron 14 processing, according to the Class Instantiation Table 8 Class Name 401 parameter, and creates Peripheral Neurons 14. The Peripheral Neurons 14 designation guides the run-time simulation as to which Neurons need special System 10 processing.

TABLE 8

Class Instantiation Table

| Parameter | | Description |
|---|---|---|
| 401 | Class Name | Name of the Java class to be instantiated |
| | | The above is repeated for every required class |

Next, Create VDT 265 process is called to create a coordinate skeleton for the entirety of Dendrites 222 each of which has Coordinates 2224. Coordinates 2224 are then populated to the VDT by Populate VDT 266. The final steps in Build 23 Phase I are concerned with using the VAT and VDT to Connect Axons to Dendrites 267 and to Connect Dendrites to Axons 268. Connect 267 goes through the Neuron Records 12 and 13 looking at each Axon 221's Coordinates 2214. Corresponding coordinates in the VDT are scanned looking for a proximally located dendrite entry that is free for connection. "Proximally located" refers to Table 4's Proximal Distance 276 parameter. Distance 276 is calculated by the technology during the creation of the Coordinate Superstructure with Blocks 80 described in the detail of FIG. 5. The calculation is a result of searching for maximum distance between any two Neurons 12 or 13. The maximum distance found is the value used for Distance 276. The dendrite candidate is verified to not be from the same neuron as that of the axon by using Neuron ID 241. A further check is made from Layers Table 2 to see if the Neuron Type 212 for this Axon 221 has a Preference 214 parameter for the Neuron Type 212 belonging to the candidate Dendrite 222. If so all Dendrite 222's Types 212 within Distance 276 parameter are scrutinized using Table 2 Preference 214 parameters in descending order. If a candidate is found it is connected.

However, if Exclusive is indicated in Preferences 214 then the search focuses exclusively on that Type 212 for connecting axon to dendrite. If no Preference 214 parameter is set then a check is made for Default Preference 215. If 215 has an entry then either the nearest neighbor, most proximally located Axon 221 is chosen or a random selection is made amongst the candidate Axon 221s. The decision is made according to Connection 215's setting. If Default Preference 215 has no value then the Default Connection 279 parameter is used. Connection 279 uses the same nearest neighbor or random selection settings as in Default Preference 215. A connection creates dual entries for both Neuron Types 212. Type 212 for the Axon 221 has its Connection 2215 parameter set to the Neuron ID 241 of the Type 212 of the Dendrite 222. The corresponding Type 212 for the Dendrite 222 has its Connection 2225 set to the Neuron ID 241 that contains the Axon 221 which was precipitated by Connect 267. When Connect 267 has completed Connect 268 is invoked to perform the analogous process of 267 but starting with Dendrites 222 that might have not been connected by 267. Connect 268 goes through the list of Neuron Records 12 and 13 looking at each Dendrites 222's coordinates 2224. Those coordinates are then searched for in the VAT looking for Axon 221 candidates within Distance 276 parameter that are unconnected. The Neuron ID 241 of both Axon 221 and Dendrite 222 are then verified to not be the same. If different then Layers Table 2 is scanned using the Axon 221's Neuron Type 212 as a key. Then its Preference 214 parameter is scanned to see if the Neuron Type 212 for the Dendrite 222's is listed. All such Axon 221s within Distance 276 parameter are scanned similarly and the highest preference is chosen. That occurs unless an Exclusive parameter is set in the 214 Preference for a given Axon 221's Neuron Type 212. If so, and it matches the Neuron Type 212 of Dendrite 222 then that Axon 221 is chosen. If no Preference 214 parameter is set then a check is made for Default Preference 215. If Default Preference 215 has an entry then either the nearest neighbor, most proximally located Axon 221 is chosen or a random selection is made amongst the candidate Axon 221s. A decision is made according to Default Preference 215 setting. If Default Preference 215 has no value then the Default Connection 279 parameter is used. Connection 279 uses the same nearest neighbor or random selection settings as in Default Preference 215. The Axon 221 and Dendrite 222 are then dually connected similarly to the Connection 267 process. A connection creates dual entries for both Neuron Types 212. Type 212 for the Axon 221 has its Connection 2215 parameter set to the Neuron ID 241 of the Type 212 of the Dendrite 222. Corresponding Type 212 for the Dendrite 222 has its Connection 2225 set to the Neuron ID 241 that contains the Axon 221 which was found by Connect 268.

FIG. 10 illustrates further detail of Neuron Records 12 and 13. Each Neuron Record 12 and 13 has a parameter of its type, Neuron Type 212, which has been requested by the user. The technology assigns both the Neuron ID 241 and Coordinates 242. The technology also copies block numbers into each Neuron Record 12 and 13 and that is recorded in parameter Block Number 203. Each excitatory neuron also has a record of its memories, Memory Record 250 as well as the particular memory which is active, Active Memory 259. Neuron memories are described in further detail in FIG. 11. and FIG. 15. Each Neuron Record 12 and 13 also have parameters for their Axons 221 and Dendrites 222, which are copied to the Neuron Record 12 and 13. During Build 23 Phase I the technology assigns Axon 221 parameters ID 2213, Coordinates 2214 and Connection 2215. Dendrite 222 parameters Layer 2220, Block 2221 and Repetitions 2222 are established by the user in the Neuron Characteristics Table 3 222 parameters. The Table 3 222 parameter are copied to the Neuron Record 12 and 13. During Build 23 Phase I the technology assigns Dendrite 222 parameters ID 2223, Coordinates 2224 and Connection 2225.

Figure 11:
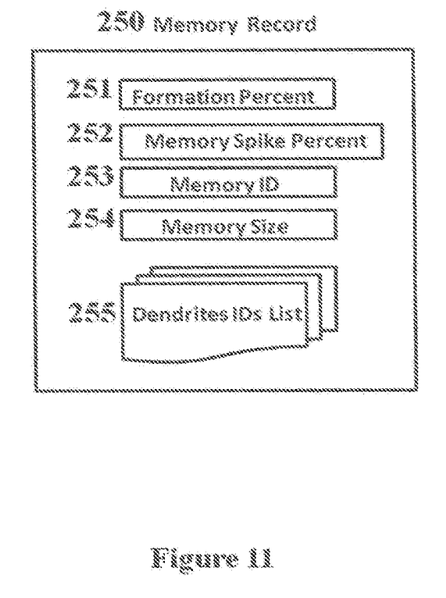
FIG. 11 illustrates memory record detail that is a part of the Neuron Record.

FIG. 11 illustrates further detail of Memory Record 250. A Record 250 is formed during a simulation run under conditions described in FIG. 14. However, for the sake of completeness in describing Neuron Records 12 and 13 FIG. 11 is introduced here because it is part of Records 12 and 13. Each time a Memory Record 250 needs to be formed template parameters are copied from Memory Table 5 into the Neuron Record 12 and 13. The user assigns Table 5 parameters Formation Percent 251 and Memory Elicitation Percent 252 for each Neuron Type 212 originating in Layers Table 2. The technology assigns Memory ID 253, Memory Size 254 and Dendrites IDs List 255 dynamically according to the conditions which formed the Memory Record 250.

Figure 12:
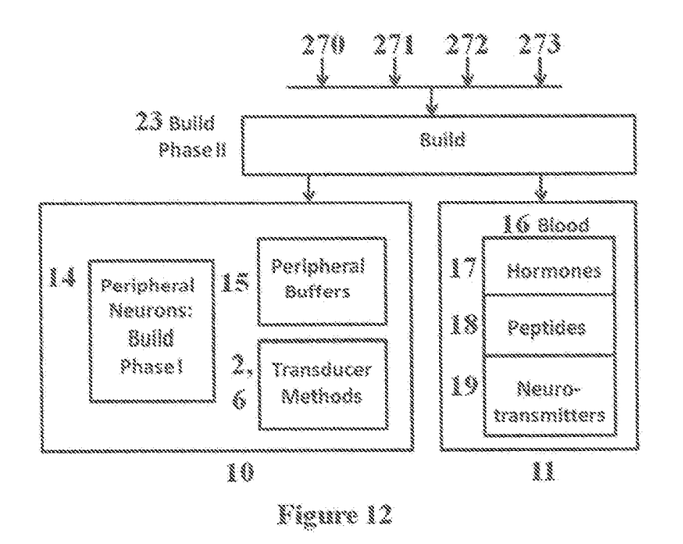
FIG. 12 illustrates Build Phase II processes in further detail.

FIG. 12 illustrates an overview of Build 23 Phase II. Build 23 Phase II is responsible for building the Peripheral Nervous System 10 and Non-Neural Components 11. IN one embodiment, to create Peripheral Nervous System 10, Build 23 Phase II uses the Peripheral Neurons 14 created by the Peripheral Neuron Extract 264 in Build 23 Phase I as well as Peripheral Buffers 15 and Transducer Methods 2 and 6. To create Non-Neuronal Components 11, Build 23 Phase II instantiates a Java class for Blood, which acts as a container for subcomponents of other Java classes like Hormones 17, Peptides 18 and Neurotransmitters 19. Non-Neuronal Components 11 is optional. Build 23 Phase II uses parameters 270, 271, 272 and 273 from Variable Control Table 4 during its processes.

TABLE 5

Memory Table

| Parameter | Description |
| --- | --- |
| 251 Formation Percent | For this neuron type, the % of dendrites to form memory |
| 252 Memory Elicitation Percent | For this neuron type, the % of a memory to fire a spike |
| 253 Memory ID | Identifier for this memory |
| 254 Memory Size | Number of dendrites participating in this memory |
| 255 Dendrites IDs List | Dendrite IDs of this memory.<br>ID 1<br>ID 2<br>ID 3<br>.<br>.<br>. |

Figure 13:
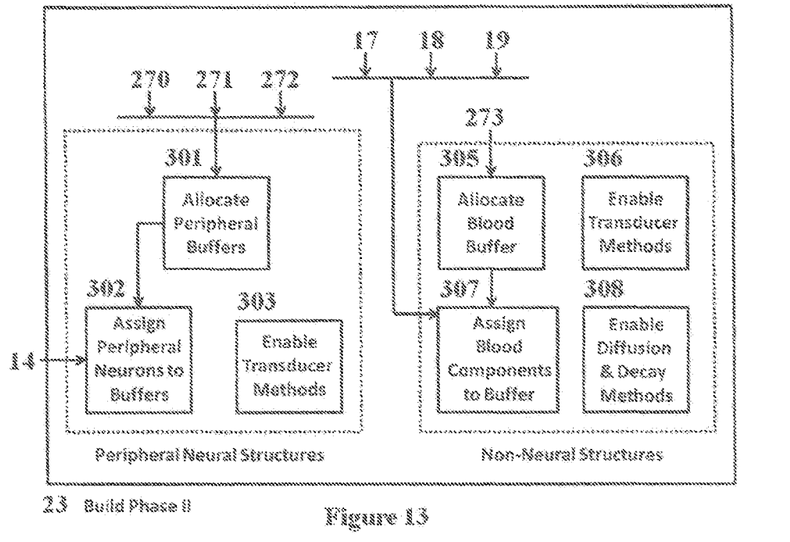
FIG. 13 illustrates Peripheral Neural Structures and Non-Neural Structures which result from the Build Phase II processes.

FIG. 13 illustrates expanded detail of Build 23 Phase II. Each type of input or output in the technology requires a separate Java class, in one embodiment, which contains Peripheral Buffers 15 and Transducer Methods 2 and 6. 23 Phase II instantiates those classes, according to the Class Instantiation Table 8 Class Name 401 parameter, and uses Table 4 parameters 270, 271 and 272 for Allocate Peripheral Buffers 301. Assign Peripheral Neurons to Buffers 302 takes Peripheral Neurons 14 and associates them to Buffers 301. As a part of instantiating a class containing Transducer Methods 2 or 6 the Methods of that class are enabled and operational. Instantiating the class is performed by Enable Transducer Methods 303. When optional Non-Neuronal Components such as 17, 18 and 19 are included as Java classes then they require a carrying medium, Blood 16, of which they form subcomponents. In the process of Build 23 Phase II instantiating these optional classes Allocate Blood Buffer 305 is called to read parameter 273 from Table 4 and allocate a Blood Buffer of size 273. The resultant buffer has subcomponents assigned to it by Assign Blood Components to Buffer 307 from components such as 17, 18, 19 or others such as suits the user's requirements. The Transducer Methods 2 and 6 required to put components into the Blood Buffer or read the contents of those components from the Blood Buffer are enabled by Enable Transducer Methods 306. As well, the user might want to include other Java methods for diffusing components into the Blood Buffer or to decay components from the Blood Buffer. These latter two kinds of methods are enabled by Enable Diffusion & Decay Methods 308.

Figure 14:
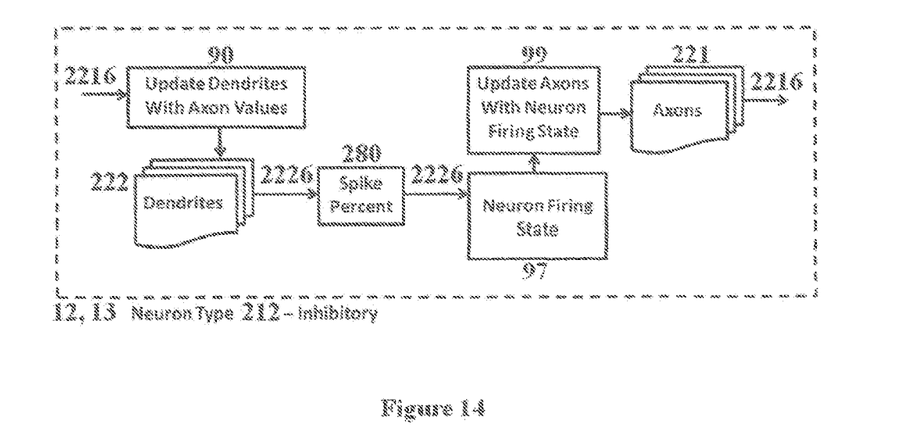
FIG. 14 illustrates processes for updating an inhibitory neuron's state during a simulation run.

FIG. 14 illustrates the detail of an update cycle to Neuron 12 and 13 when the Type 212 is inhibitory. For inhibitory neurons, which are not regarded as having memory capacity, an update cycle consists of two processes: activating dendrites with Axon 221 Values 2216 from the previous update cycle and then calculating a current Axon 221 Value 2216 for the next update cycle. The first process is completed for all neurons before the second process begins. This approach mimics the parallel processing of nervous systems by insuring that each neuron is guaranteed to be updated at each time step. Other approaches such as only updating a neuron when its dendrites change values have a tendency to regressively update specific neurons while ignoring the rest of the system's activity in a dyssynchronous fashion. Update Dendrites With Axon Values 90 takes the previous update cycle's Axon 221, Value 2216 and brings the value in contact for the Dendrites 222 that are pointed to by Connection 2215. The Dendrite 222's Value 2226 is then passed through Spike Percent 280 and if Value 2226 has at least Spike Percent 280's value then Value 2226 is passed to Neuron Firing State 97. If State 97 has a value passed to it then the value is sufficient to cause a neuron spike, which represents a value placed onto its Axons 221. Update Axons With Neuron Firing State 99 accomplishes this task and for every one of its Axon 221 places a positive value of 1 into Value 2216.

Figure 15:
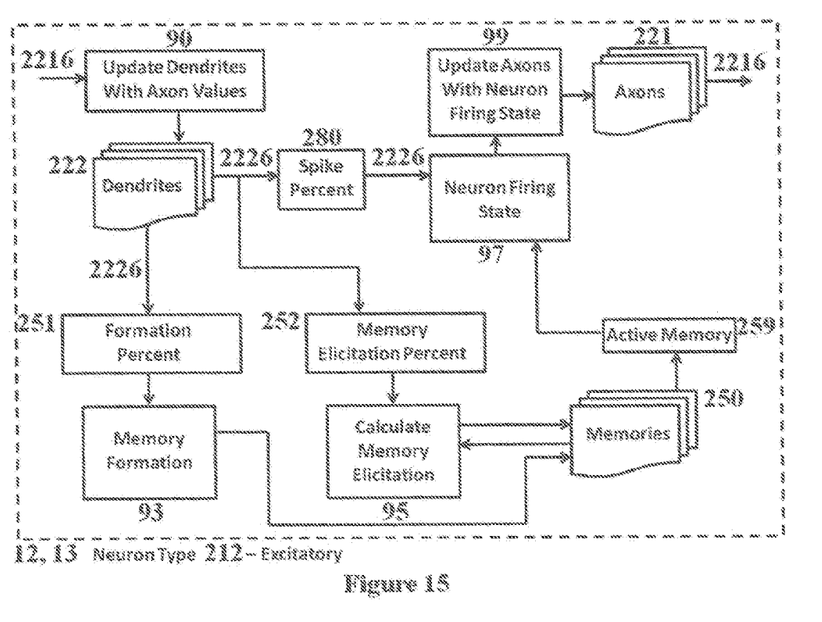
FIG. 15 illustrates processes for updating an excitatory neuron's state during a simulation run.

FIG. 15 illustrates the detail of an update cycle to Neuron 12 and 13 when the Type 212 is excitatory. For excitatory neurons, which are regarded as having memory capacity, an update cycle consists of three processes: activating dendrites with Axon 221 Values 2216 from the previous update cycle and then establishing whether or not to create or activate a memory and then calculating current Axon 221 Values 2216 for the next update cycle. The first process is completed for all neurons before the second and third processes begin. This approach mimics the parallel processing of nervous systems by insuring that each neuron is guaranteed to be updated at each time step. Update Dendrites With Axon Values 90 takes the previous update cycles Axon 221, Value 2216 and brings the value in contact for the Dendrites 222 that are pointed to by Axon 221's Connection 2215. The Dendrite 222's Value 2226 is then passed through Spike Percent 280 and if Value 2226 has at least Percent 280's value then Value 2226 is passed to Neuron Firing State 97. If State 97 has a value passed to it then the value is sufficient to cause a neuron spike, which represents a value placed onto its Axons 221. Update Axons With Neuron Firing State 99 accomplishes this task and for every one of its Axon 221 places a positive value of 1 into Value 2216. The other value, which may be passed to Calculate 97, originates with the activation of a Memory 250 record, whose original formation begins with Dendrite 222's Value 2226. That value is passed through Memory Table 5 Formation Percent 251 parameter. If the value is passed to Memory Formation 93 then there is a value sufficient to form a memory and if so, forms a Memory Record 250 subject to this being a new memory. Creating the Record 250 begins with copying the FIG. 11 parameters as a template into Neuron 12 or 13. A Memory ID 253 is determined by adding the value of 1 to the next most recently formed Memory Record 250, if any; else the ID begins with 1. The number of Dendrite 222's participating in the Record 250 is recorded as Memory Size 254 and the Dendrite IDs 255 of the Dendrites 222 participating in the new Record 250 is also recorded. To determine if this is a new Record 250, the Value 2226 is passed to Table 5 Memory Spike Percent 252 parameter and Calculate Memory Elicitation 95 scans Memory Records 250 to see if the Value 2226 and Percent 252 are sufficient to elicit a previous Record 250. If so, no new Record 250 is formed and the past Record 250 is made the Active Memory 259.

Table 6 shows options available for Reporting 54 as shown in FIG. 1 and FIG. 8. Reports by default are shown on the display console device but optionally, if the user fills in Report File Name 541, then the console report will also be written to the file. Report Type 542 gives the simulation run report options. Type 542=1 indicates that all Neuron 12 and 13, which have positive Axon 221 Value 2216 will be reported. Type 542=2 indicates that Autonomic Nervous System 40 activity will also be reported. Type 542=3 indicates that Neuron 12 and 13 which have positive Axon 221 Value 2216 will be reported as well as any Dendrite 222's causing that value. If Memory Allocation 543=Yes then every new Neuron 12 and 13 Memory Record 250 will be reported. During Build 23 the user has the following report options. If Neuron Allocation 544=Yes then all Neuron 12 and 13 allocated are reported. If Neuron Connection 545=Yes then all Neuron 12 and 13 connections are reported.

TABLE 6

Report Table

| | Parameter | Description |
|---|---|---|
| 541 | Report File Name | Name of report file |
| 542 | Report Type | Report |
| | | 1 = Neuron activity only |
| | | 2 = Neuron and non-neural activity |
| | | 3 = Neuron and dendrite activation |
| 543 | Memory Allocation | Memory allocation report: yes or no |
| 544 | Neuron Allocation | Neuron allocation report: yes or no |
| 545 | Neuron Connection | Neuron connection report: yes or no |

While the foregoing written description of the technology enables one of ordinary skill to make and use what is considered presently to be the best mode thereof, those of ordinary skill will understand and appreciate the existence of variations, combinations, and equivalents of the specific embodiment, method, and examples herein. For example, although Brodmann cytoarchitectural mapping is employed in embodiments here, other cytoarchitectural mappings may be used. Similarly, the number of neurons and number of cortical layers modeled may vary, depending upon the brain of a particular living, extinct, imaginary, or artificial species being modeled. Furthermore, although particular computer or modeling languages are disclosed, other computer or modeling languages my be used. The technology presented here should therefore not be limited by the above described embodiments, methods, or examples, but by all embodiments and methods within the scope and spirit of the subject technology.

I claim:

1. A utility for converting neuroanatomical information into a nervous system environment according to specifications from a user, the nervous system environment further interacting with an external environment, comprising:
a manager interface through which the user effects control of the utility, observes operation of the utility, and provides neuroanatomical information to the utility;
organization means, for directing the arrangement of neuroanatomical information to create the nervous system environment,
build means in one or more phases, for arranging the neuroanatomical information according to the specifications,
said build means being directed according to said organizing means;
control means managing the flow and arrangement of the neuroanatomical information within the utility;
input means for receiving sensor data from the external environment;
output means for presenting information to the external environment;
and
reporting means.

2. An artificial nervous system environment operating in and interacting with an external environment comprising according to user specifications:
a utility for organizing neuroanatomical information to define operation of the nervous system environment according to the user specifications;
computer instruction means directing a computer system to organize neuroanatomical information according to said user specifications,
said computer system further operating on the neuroanatomical information and user specifications as directed by said computer instruction means;
input sensor means for providing information from the external environment to the nervous system environment;
output means for presenting information to the external environment;
and
reporting means.

3. The artificial nervous system environment of claim 2 wherein the nervous system is deployed in a robot.

4. The artificial nervous system environment of claim 2 wherein the nervous system environment is used to control one or more external devices.

* * * * *